US011818074B2

(12) United States Patent
Wang et al.

(10) Patent No.: US 11,818,074 B2
(45) Date of Patent: Nov. 14, 2023

(54) TIMING RESPONSE-BASED CLOCK FREQUENCY OFFSET ESTIMATION METHOD FOR INDUSTRIAL WIRELESS SENSOR NETWORK

(71) Applicant: CHONGQING UNIVERSITY OF POSTS AND TELECOMMUNICATIONS, Chongqing (CN)

(72) Inventors: Heng Wang, Chongqing (CN); Yang Zhong, Chongqing (CN); Fei Yu, Chongqing (CN)

(73) Assignee: Chongqing University Of Posts And Telecommunications, Chongqing (CN)

( * ) Notice: Subject to any disclaimer, the term of this patent is extended or adjusted under 35 U.S.C. 154(b) by 143 days.

(21) Appl. No.: 17/418,252

(22) PCT Filed: Jan. 14, 2020

(86) PCT No.: PCT/CN2020/072067

§ 371 (c)(1),
(2) Date: Jun. 25, 2021

(87) PCT Pub. No.: WO2020/147727

PCT Pub. Date: Jul. 23, 2020

(65) Prior Publication Data

US 2022/0085954 A1 Mar. 17, 2022

(30) Foreign Application Priority Data

Jan. 18, 2019 (CN) ......................... 201910049042.7

(51) Int. Cl.
*H04L 12/28* (2006.01)
*H04L 5/00* (2006.01)
(Continued)

(52) U.S. Cl.
CPC .............. *H04L 5/0055* (2013.01); *H04J 3/06* (2013.01); *H04L 1/16* (2013.01)

(58) Field of Classification Search
CPC ................................ H04L 5/0055; H04J 3/06
See application file for complete search history.

(56) References Cited

U.S. PATENT DOCUMENTS 9,130,687 B2 * 9/2015 Webb, III ............. H04J 3/0635
2016/0248569 A1 * 8/2016 Ghosh ..................... H04L 1/165
(Continued)

OTHER PUBLICATIONS

Wang et al., Linear Estimation of Clock Frequency Offset for Time Synchronization Based on Overhearing in Wireless Sensor Networks, 2015, IEEE, pp. 1-4 (Year: 2015).*
(Continued)

*Primary Examiner* — Chi H Pham
*Assistant Examiner* — Elisabeth Benoit Magloire
(74) *Attorney, Agent, or Firm* — Michael D. Eisenberg

(57) ABSTRACT

The present invention relates to a method for estimating clock frequency offsets of industrial wireless sensor networks based on timing response. In the method, a data packet is sent from a node to be synchronized to a reference node. After the reference node receives the data packet, it replies an acknowledgement after a timing response interval, which is mapped according to a sequence number of the data packet. After communication and interaction for multiple times, a relative frequency offset and a fixed delay between node clocks can be estimated by the node to be synchronized without exchanging timestamp information. The present invention does not need to receive or send messages specially used for time synchronization parameter estimation, which realizes a long-term tracking of clock frequency offset with a low computation cost and reduces communication overhead and energy consumption.

2 Claims, 3 Drawing Sheets

(51) Int. Cl.
*H04J 3/06* (2006.01)
*H04L 1/16* (2023.01)

(56) References Cited

U.S. PATENT DOCUMENTS

2017/0288818 A1* 10/2017 Bock ....................... H04L 1/188
2019/0278737 A1* 9/2019 Kozomora .......... G06F 11/0745

OTHER PUBLICATIONS

English Translation of Written Opinion of the International Searching Authority, PCT/CN2020/072067, dated Apr. 7, 2020, WIPO, pp. 1-5 (Year: 2020).*

* cited by examiner

TIMING RESPONSE-BASED CLOCK FREQUENCY OFFSET ESTIMATION METHOD FOR INDUSTRIAL WIRELESS SENSOR NETWORK

FIELD OF INVENTION

The present invention belongs to the technical field of wireless sensor networks, which relates to a method for estimating timing response clock frequency offsets applicable to industrial wireless sensor networks.

BACKGROUND ART OF THE INVENTION

A wireless sensor network is composed of a plurality of cheap and tiny sensor nodes which are distributed in space and have limited calculation ability, storage capacity and energy. All nodes operate on their own independent clocks. Because of the characteristics such as flexible deployment and low cost, wireless sensor networks have been widely used in many fields such as industry. Most of the traditional industrial networks adopt a wired connection mode, which limits the deployment flexibility and the intelligent control of an industrial process. Based on the advantages of wireless sensor networks, industrial wireless sensor networks emerge as the industries require. Wireless micro sensor nodes are deployed on many industrial field devices and are responsible for collecting industrial environmental data and industrial process data, and a large number of sensor nodes operate cooperatively to realize a high-efficient, flexible and intelligent industrial process. A complex industrial field environment leads to high requirements for reliability, real-time performance and low power consumption of industrial wireless sensor networks. Currently, ISA100.11a and other wireless sensor network standards specially used for industrial field environment have been established.

Time synchronization technology is an important supporting technology for the application of the industrial wireless sensor networks and different nodes are required to operate on a common time scale in the practical application of the industrial wireless sensor networks. Consider that clock frequency offset is a main factor causing synchronization errors among the nodes, therefore it is important for the industrial wireless sensor network to obtain clock frequency offset parameters of the nodes. The existing methods for estimating clock frequency offsets usually need dedicated synchronization messages and timestamp information exchange during transmission, thereby causing relatively large synchronization overhead.

Aiming at the above problems, the present invention provides a relative clock frequency estimation method based on timing response for industrial wireless sensor networks with a time slot mechanism. By embedding the implementation of frequency offset estimation into the sending and acknowledgement (ACK) processes of ordinary data packets, long-term tracking of frequency offsets can be realized without transmitting special time synchronization messages and timestamp information. Moreover, the possibility of timestamp attack is avoided, synchronization overhead of resource-limited industrial wireless sensor networks is reduced, thus improving the synchronization safety.

DISCLOSURE OF THE INVENTION

In view of this, the purpose of the present invention is to provide a method for estimating clock frequency offsets of industrial wireless sensor networks based on timing response, which does not need dedicated data frames to exchange timestamp information between synchronization nodes. The nodes can realize long-term smooth tracking of clock synchronization frequency offsets during transmission of network data packets, and more accurate clock frequency offsets are obtained with a low cost. Therefore, the present invention reduces the number of transmission messages in the network and the communication overhead of resource-limited nodes. In addition, this present invention avoids the potential possibility of timestamp message attack during time synchronization exchange, and thus improves the safety and reliability of the network.

To achieve the above purpose, the present invention provides the following technical solution:

A method for estimating clock frequency offsets of industrial wireless sensor networks based on timing response, which does not need additional communication bandwidth specially used for clock synchronization parameter estimation to transmit the message specially used for time synchronization in a wireless sensor network, and does not need timestamp exchange between nodes. When an arbitrary node S to be synchronized in the network needs to realize synchronization with a reference node R, two-way communication between the nodes is carried out in a communication mode of one-way data packet+ACK.

A time synchronization algorithm is performed along with data sending and receiving of a sending node S. It is assumed that the node S sends a data packet to the reference node R at its local time $T_{1,i}^{(S)}$, the reference node R receives the data packet after a period of time, the period of time is mainly influenced by a fixed time delay $d_1$ and a random time delay $X_i$ during data packet transmission. The reference node R receives a message the data packet message sent by the node S at its local time $T_{2,i}^{(R)}$, and returns an acknowledgement message at its local time $T_{3,i}^{(R)}$ after a timing response interval $w_i$. Here, timing response intervals corresponding to different data packets are calculated in a mode of sequence numbers modulo i(i≥2) according to different sequence numbers Seq of the data packets in the network. Specifically, when the sequence number Seq % i=0, ACK is returned after a timing response interval $w_1$; when the sequence number Seq % i=1, ACK is returned after a timing response interval $w_2$; when the sequence number Seq % i=2, ACK is returned after a timing response interval $w_3$; . . . ; when Seq % i=i−2, ACK is returned after a timing response interval $w_{i-1}$; and when Seq % i=i−1, ACK is returned after a timing response interval $w_1$, (both a receiver and a sender know corresponding calculation rules in advance, and wait according to the rules). At the time $T_{3,i}^{(R)}$, an ACK message is returned from the reference node R to the node S, and a time) $T_{4,i}^{(R)}$ when a response message is received is recorded by the node S. It should be noted that in this process, the timestamp information of each sending or receiving time is not carried in exchanged data frames. The above process is repeated. After N times of message exchange, the sending node S can obtain a group of local timestamps $\{T_{1,i}^{(s)}, T_{4,i}^{(s)}\}_{i=1}^{N}$, and similarly, the node R can obtain a group of local timestamps) $\{T_{2,i}^{(R)},T_{3,i}^{(R)}\}_{i=1}^{N}$ Combined with the different timing response intervals $w_i$, of the node R, a frequency offset between the nodes and the fixed delay during transmission can be estimated by a statistical signal processing method.

The method for estimating clock frequency offsets specifically comprises the following steps:

S1: the estimation of clock frequency offset is performed along with data packet sending and receiving of the nodes, assuming that the node S to be synchronized sends a data packet to the reference node R at a local time $T_{1,i}^{(S)}$, and records the sending time $T_{1,i}^{(S)}$; S2: as crystal oscillators of the node R and the node S have different frequencies, if $f_R$ represents a crystal oscillator frequency of the node R, and $f_s$ represents a crystal oscillator frequency of the node S, the reference node R records a local time $T_{2,1}^{(R)}$ when receiving a data frame sent by the node S; as influenced by a fixed delay $d_1$ during data packet transmission and a random delay $X_i$ in an uplink, it can be obtained that $$T_{2,i}^{(R)}=\alpha\times T_{1,i}^{(S)}+\theta_{10}+\alpha\times(d_1+X_i)$$

wherein $$\alpha=\frac{f_R}{f_S}$$

represents clock frequency offset of the node S relative to the node R, $\theta_{t_0}$ represents initial phase offset between the nodes, $X_i$ represents an independent and identically distributed Gaussian variable, and $d_1$ represents the fixed delay during data packet transmission;

The node R returning an ACK message to the node S to be synchronized after the timing response) interval $w_1$, and at the same time, recording a local time $T_{3,i}^{(R)}$ when the ACK message is returned, wherein the interval $w_1$ depends on specific conditions of the sequence number of the data packet received by the node R in each cycle modulo i, and $i\leq 2$;

S3: the node S to be synchronized records its local time $T_{4,i}^{(S)}$ when receiving the response message from the reference node R; based on the fact that length of an ACK data packet is usually smaller than that of a data packet in the network, and that the fixed delay is mainly influenced by the length of the data packet, here, the fixed delay $d_2$ during transmission of an ACK data packet is assume to be equal to the fixed delay $d_1$ during data packet transmission minus a constant value m, wherein, $d_2=d_1-m$; similarly, with the influence of the fixed delay $d_2$ during transmission and a random delay $Y_i$ in a downlink, the following timestamp relation expression is obtained:

$$T_{3,i}^{(R)}=\alpha\times T_{4,i}(s)\theta_{10}-\alpha\times(d_2+Y_i)$$

wherein $Y_i$ is an independent and identically distributed Gaussian variable;

S4: repeating the above steps S1-S3; if $$\alpha=\frac{1}{\beta},$$

and a matrix is used to store the timestamps $T_{1,i}^{(S)}$, $T_{2,i}^{(R)}$, $T_{3,i}^{(R)}$, $T_{4,i}^{(S)}$ and different timing response intervals $w_i$, of the node R, then clock synchronization parameters, i.e., the clock frequency offset α and the fixed time delay $d_1$ during data packet transmission, can be estimated after N cycles, and the formulas are as follows:

$$\underbrace{\begin{bmatrix} T_{4,1}-T_{1,1}+m \\ T_{4,2}-T_{1,2}+m \\ \dots \\ T_{4,N}-T_{1,N}+m \end{bmatrix}}_{\triangleq R} = \underbrace{\begin{bmatrix} T_{3,1}-T_{2,1} & 2 \\ T_{3,2}-T_{2,2} & 2 \\ \dots & \dots \\ T_{3,N}-T_{2,N} & 2 \end{bmatrix}}_{\triangleq M} \underbrace{\begin{bmatrix} \beta \\ d_1 \end{bmatrix}}_{\triangleq \Theta} + \underbrace{\begin{bmatrix} Z_1 \\ Z_2 \\ \dots \\ Z_N \end{bmatrix}}_{\triangleq Z}$$

$$\hat{\Theta}=\left(M^H M\right)^{-1}M^H R$$

-continued $$\hat{\alpha}=\frac{1}{\hat{\beta}}=\frac{1}{[\hat{\Theta}]_1}$$

$$\hat{d}_1=[\hat{\Theta}]_2$$

wherein $\hat{\alpha}$ is the clock frequency offset estimator, $\hat{d}_1$ is the fixed time delay estimator during data packet transmission, and $Z_i=X_i+Y_i$ is the independent and identically distributed Gaussian variable, i.e., $Z_1$: $N(0, \sigma^2)$.

Further, in step S2, taking the conditions that the sequence number Seq of the data packet received by the node R in each cycle modulo i with $i\geq 2$ as an example, the corresponding rules for obtaining the interval $w_i$, are as follows:

When the sequence number Seq % i=0, the timing response interval for returning ACK is $w_1$;

When the sequence number Seq % i=1, the timing response interval for returning ACK is $w_2$;

When the sequence number Seq % i=2, the timing response interval for returning ACK is $w_3$;

When the sequence number Seq % i=i−2, the timing response interval for returning ACK is $w_{i-1}$;

When the sequence number Seq % i=i−1, the timing response interval for returning ACK is $w_1$.

The present invention has following beneficial effects:

(1) The mode of the present invention is based on an ordinary data packet transmission and ACK communication mechanism, the node to be synchronized can realize the estimation and long-term smooth tracking of the clock frequency offset and the fixed delay during the receiving and sending of an ordinary data packet, which saves the energy of resource-limited sensor nodes and meets the requirement of low power consumption of wireless sensor networks.

(2) The method of the present invention does not need dedicated synchronization messages with timestamp information for interaction during the estimation of the clock frequency offset and the fixed delay. In fact, a timestamp is a potential attack point in a time synchronization protocol, but the method for estimating clock frequency offsets provided by the present invention does not need to transmit any timestamp during implementation, thereby improving the safety of the network.

(3) In the method for estimating clock frequency offsets of industrial wireless sensor networks based on timing response provided by the present invention, a time slot template of ISA100.11a is taken as an example for explanation. The timing response interval for returning ACK defined by ISA100.11a is expanded, the receiving node adopts the policies of establishing a mapping table and conducting modulo operation with the sequence numbers to obtain two or more different values of the timing response interval according to different sequence numbers of received data packets, and the timing response intervals for returning ACK messages according to different sequence numbers are calculated. Therefore, the present invention is easy to integrate into the existing industrial wireless sensor networks with a time slot mechanism and has a good practical application value.

DESCRIPTION OF THE DRAWINGS

To enable the purpose, the technical solution and the beneficial effects of the present invention to be clearer, the present invention provides the following drawings for explanation.

DETAILED DESCRIPTION OF THE INVENTION

Preferred embodiments of the present invention will be described below in detail in combination with drawings.

Figure 1:
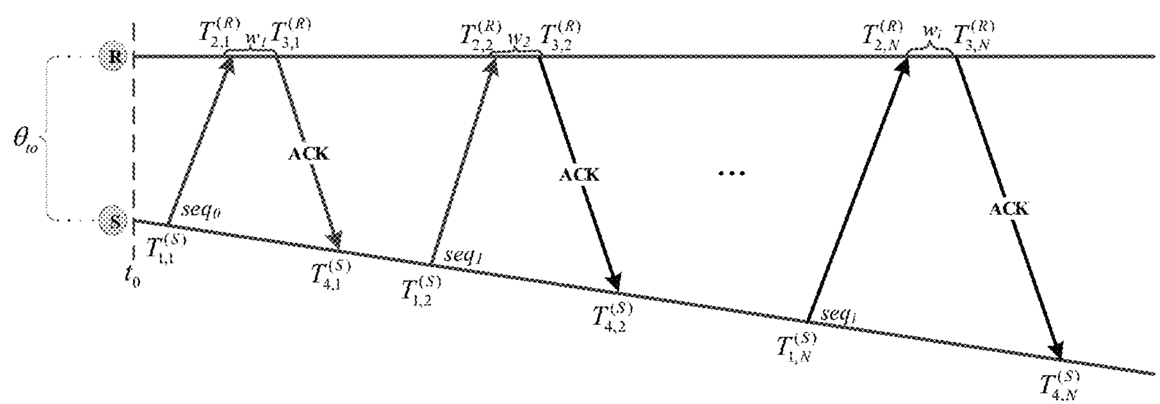
FIG. 1 is a schematic diagram of a data packet exchange mechanism between synchronization nodes of the present invention.

FIG. 1 is a schematic diagram of a data packet exchange mechanism between synchronization nodes in the method for estimating clock frequency offsets of industrial wireless sensor networks based on timing response of the present invention. As shown in FIG. 1, in an industrial wireless sensor network, an ordinary node S is used as a node to be synchronized, a receiving node R is used as a clock source node, and two-way communication between the two nodes is carried out by a communication mechanism of one-way data packet+ACK.

In the method for estimating clock frequency offsets of industrial wireless sensor networks based on timing response of the present invention, because of no timestamp exchange, a synchronization function can be embedded in the process of receiving and sending data packets. It is assumed that the sending node S sends a data packet to the reference node R at its local time $T_{1,i}^{(S)}$, the reference node R receives the data packet after a period of time. After the data packet message sent by the node S is received, the node R returns an ACK message to the node S to be synchronized after the timing response interval $w_i$, and at the same time, records its local time $T_{3,i}^{(R)}$ when the ACK message is returned. The timing response interval $w_i$ depends on specific conditions of the sequence number of the data packet received by the node R in each cycle modulo i(i≥2), and the corresponding mapping rules are as follows: when the sequence number Seq % i=0, the timing response interval for returning ACK is $w_1$; when the sequence number Seq % i=1, the timing response interval for returning ACK is $w_2$; when the sequence number Seq % i=2, the timing response interval for returning ACK is $w_3$; . . . ; when Seq % i=i−2, the timing response interval for returning ACK is $w_{i-1}$; when Seq % i=i−1, the timing response interval for returning ACK is $w_i$. Then the node S records the time $T_{4,i}^{(S)}$ when receiving the response message. The above process is repeated, and the clock frequency offset between the nodes and the fixed delay during data packet transmission can be estimated by a statistical signal processing method.

The Specific Steps are as Follows:

For the first synchronization cycle, an implementation model of $T_{2.1}^{(R)}$ can be expressed as $$T_{2.1}^{(R)}=\alpha\times T_{1.1}^{(s)}+\theta_{t_0}+\alpha\times(d_1+X_1) \tag{1}$$

wherein $\theta_{t_0}$ and a represent initial clock phase offset and frequency offset at time $t_0$ respectively, and the fixed delay during data packet transmission and random delay in the uplink are respectively denoted by $d_1$ and $X_1$.

Here, it is assumed that the sequence number of the first data packet for data exchange is $Seg_0$ and $Seg_0$ is an integer multiple of 3, i.e., $Seq_0$%3=0. After a certain interval, the node R returns an ACK message to the node S. According to the mapping relationship between the sequence number of the data packet and the timing response interval, it can be obtained that the timing response interval for returning ACK by the node R in the first cycle is $w_1$.

Assuming that the time when the node R returns ACK is $T_{3.1}^{(R)}$, then:

$$T_{3.1}^{(R)}=T_{2.1}^{(R)}+W_1 \tag{2}$$

The time $T_{3.1}^{(R)}$ when the node R returns ACK and the time $T_{4.1}^{(S)}$ when the node S receives ACK satisfy that:

$$T_{3.1}^{(R)}=\alpha\times T_{4.1}^{(S)}+\theta_{10}-\alpha\times(d_2+Y_1) \tag{3}$$

Here, the fixed delay $d_2$ during transmission of the ACK data packet is equal to the fixed delay $d_1$ during data packet transmission minus a constant value m, wherein, $d_2=d_1-m$, and $Y_1$ is a random delay in the downlink of the first cycle.

Similarly, for the second synchronization cycle, $T_{2.2}^{(R)}$ can be expressed as $T_{2.2}^{(R)}=\alpha\times T_{1.2}^{(s)}+\theta_{t_0}+\alpha\times(d_1+X_2)$, wherein $X_2$ is the random delay in the uplink in the network during data packet transmission.

When the sequence number of the data packet in the second cycle is that $Seg_1$%3=1, it can be obtained that the interval for returning ACK is $W_2$ according to the mapping relationship. The time $T_{3.2}^{(R)}$ when the node S returns ACK is: $T_{3.2}^{(R)}=T_{2.2}^{(R)}+w_2$. $T_{3.2}^{(R)}$ and $T_{4.2}^{(S)}$ satisfy the following relationship:

$$T_{3.2}^{(R)}=\alpha\times T_{4.2}^{(S)}+\theta_{10}+\alpha\times(d_2+Y_2) \tag{4}$$

After N rounds of data packet exchange, a mathematical model of the exchange process can be obtained, $$T_{2,i}^{(R)}=\alpha\times T_{1,i}^{(S)}+\theta_{t_0}+\alpha\times(d_1+x_i) \tag{5}$$

$$T_{3,i}^{(R)}=\alpha\times T_{4,i}^{(S)}+\theta_{10}-\alpha\times(d_2+Y_i) \tag{6}$$

$$w_1\in(w_1,w_2,\ldots,w_i) \tag{7}$$

$$T_{3,i}^{(R)}=T_{2,i}^{(R)}+wi \tag{8}$$

After N cycles, the sending node S can obtain a group of local timestamps $\{T_{1,i}^{(S)},T_{4,i}^{(S)}\}_{i=1}^{N}$, and similarly, the node R can obtain a group of local timestamps $\{T_{2,i}^{(R)}, T_{3,i}^{(R)}\}_{i=1}^{N}$. Combined with the different response intervals $w_i$, of the node R, the frequency offset between the nodes and the fixed delay during data packet transmission can be estimated by a statistical signal processing method. The formulas are as follows:

$$\underbrace{\begin{bmatrix} T_{4,1}-T_{1,1}+m \\ T_{4,2}-T_{1,2}+m \\ \cdots \\ T_{4,N}-T_{1,N}+m \end{bmatrix}}_{\triangleq R} = \underbrace{\begin{bmatrix} T_{3,1}-T_{2,1} & 2 \\ T_{3,2}-T_{2,2} & 2 \\ \cdots & \cdots \\ T_{3,N}-T_{2,N} & 2 \end{bmatrix}}_{\triangleq M} \underbrace{\begin{bmatrix} \beta \\ d_1 \end{bmatrix}}_{\triangleq\Theta} + \underbrace{\begin{bmatrix} Z_1 \\ Z_2 \\ \cdots \\ Z_N \end{bmatrix}}_{\triangleq Z} \tag{9}$$

$$\hat{\Theta}=\left(M^H M\right)^{-1}M^H R \tag{10}$$

Thus, a clock frequency offset estimator $\hat{\alpha}$ of the sending node S relative to the node R and a fixed time delay estimator $d_1$ during data packet transmission can be obtained, wherein $Z_i=X_i+Y_i$ is the independent and identically distributed Gaussian variable, i.e., $Z_i$: $N(0, \sigma^2)$, and N is the number of synchronization cycles between the two nodes.

$$\hat{\alpha}=\frac{1}{\hat{\beta}}=\frac{1}{[\hat{\Theta}]_1} \tag{11}$$

-continued $$\hat{d}_1 = [\hat{\Theta}]_2 \quad (12)$$

In order to verify the effectiveness of the method for estimating clock frequency offsets of industrial wireless sensor networks based on timing response provided by the present invention, a Cramer-Rao Lower Bound (CRLB) is calculated.

$$\mathrm{Var}(\hat{\beta}) \geq \frac{N\sigma^2}{N\alpha^2\sum_{i=1}^{N}\left[(T_{4,i}-T_{1,i}-2d_1+m)^2+\delta^2\right]-\alpha^2\left[\sum_{i=1}^{N}(T_{4,i}-T_{1,i}-2d_1+m)\right]^2} \quad (13)$$

$$\mathrm{Var}(\hat{d}_1) \geq \frac{\sigma^2\sum_{i=1}^{N}\left[(T_{4,i}-T_{1,i}-2d_1+m)^2+\delta^2\right]}{4N\sum_{i=1}^{N}\left[(T_{4,i}-T_{1,i}-2d_1+m)^2+\delta^2\right]-4\left[\sum_{i=1}^{N}(T_{4,i}-T_{1,i}-2d_1+m)\right]^2} \quad (14)$$

Here, β is the inverse of the frequency offset α to be estimated, i.e., $$\beta = \frac{1}{\alpha},$$

and $d_1$ is the fixed delay during data packet transmission. The CRLB of a more general function α=g (β) of β can be obtained according to parameter transformation when the CRLB of β is known. The specific transformation formula is as follows:

$$\mathrm{Var}(\hat{\alpha}) \geq \left(\frac{\partial g}{\partial \beta}\right)^2 \mathrm{Var}(\hat{\beta}) \quad (15)$$

Thus, the CRLB of the frequency offset α is:

$$\mathrm{Var}(\hat{\alpha}) \geq \left(-\frac{1}{\beta}\right)^2 \mathrm{Var}(\hat{\beta}) \geq \frac{N\sigma^2\alpha^2}{N\sum_{i=1}^{N}\left[(T_{4,i}-T_{1,i}-2d_1+m)^2+\delta^2\right]-\left[\sum_{i=1}^{N}(T_{4,i}-T_{1,i}-2d_1+m)\right]^2} \quad (16)$$

Embodiment

Figure 2:
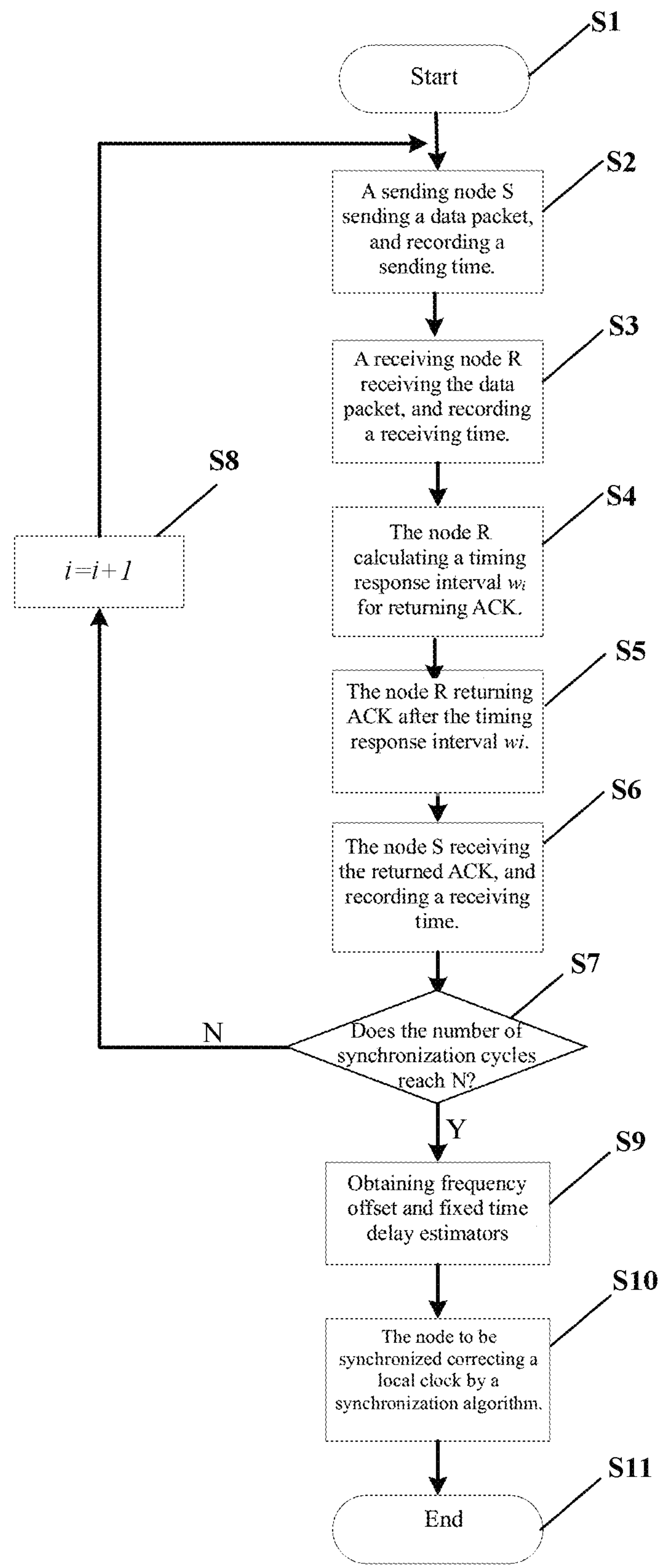
FIG. 2 is a flow chart of a method for estimating clock frequency offsets of the present invention.

FIG. 2 is a flow chart of a method for estimating clock frequency offsets based on timing response of the present invention. As shown in FIG. 2, the method for estimating clock frequency offsets specifically comprises the following steps:

S1: starting a synchronization process.

S2: a sending node S sending a data packet with a sequence number of Seq to a receiving node R, and recording a sending time $T_{1,i}^{(S)}$.

S3: the receiving node R receiving the data packet, and recording a receiving time $T_{2,i}^{(R)}$.

S4: the receiving node R obtaining a timing response interval $w_i$, required to wait for returning ACK according to the sequence number of the received data packet by a calculation rule Seq % i S5: the receiving node R returning an ACK response after the interval $w_i$, and recording a corresponding sending time $T_{3,i}^{(R)}$.

S6: the node S receiving the response ACK message from the node R, and recording a corresponding receiving time $T_{4,i}^{(s)}$.

S7-S9: determining whether the number of synchronization cycles reaches a set value N; if yes, estimating the frequency offset and the fixed delay between the nodes; otherwise, i=i+1, entering step S2 and continuing to repeat the data packet sending and receiving process.

S10: the node S to be synchronized estimating clock synchronization parameters, i.e., the frequency offset and the fixed delay, which lays a foundation for time synchronization of an industrial wireless sensor network.

S11: ending the synchronization process.

Figure 3:
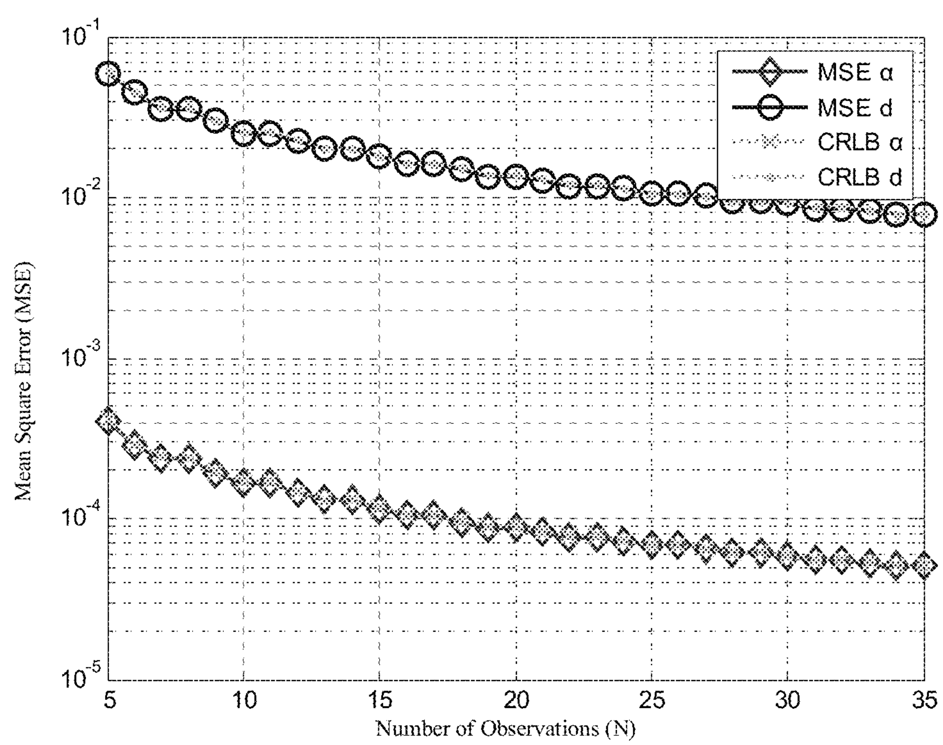
FIG. 3 is a performance comparison diagram of clock frequency offset and fixed delay estimation results of the present invention.

FIG. 3 is a performance comparison diagram of clock frequency offset and fixed time delay estimation results obtained by the method for estimating clock frequency offsets of the present invention compared with corresponding CRLBs. It can be known from FIG. 3 that mean square errors of both estimators are reduced with the increase of the number of observations; each mean square error curve is roughly coincident with the corresponding CRLB thereof, the effectiveness of the estimators $\hat{\alpha}$ and $\hat{d}_1$ are verified by simulation results, and the estimated performance is close to optimal estimate.

Finally, it should be noted that the above preferred embodiments are only used for describing, rather than limiting the technical solution of the present invention. Although the present invention is already described in detail through the above preferred embodiments, those skilled in the art shall understand that various changes in form and detail can be made to the present invention without departing from the scope defined by claims of the present invention.

The invention claimed is:

1. A method for estimating clock frequency offsets of industrial wireless sensor networks based on timing response, characterized in that: in a wireless sensor network, when an arbitrary node S to be synchronized in the network need to realize synchronization with a reference node R, two-way communication between the nodes is carried out in a communication mode of one-way data packet+ACK, and estimation of time synchronization parameters does not depend on timestamp information; because no timestamp exchange is required, synchronization function can be embedded into an existing data exchange process; after a data packet message sent by a sending node S is received by the reference node R, two or more different values of a timing response interval are obtained according to a sequence number (Seq) of a received data packet by adopting corresponding rules; and the method specifically comprises the following steps:

S1: estimation of a clock frequency offset is performed along with data packet sending and receiving of the nodes, assuming that the node S to be synchronized sends a data packet to the reference node R at a local time $T_{1,i}^{(S)}$, and records the sending time $T_{1,i}^{(S)}$;

S2: as crystal oscillators of the node R and the node S have different frequencies, if $f_R$ represents a crystal oscillator frequency of the node R, and $f_s$ represents a crystal oscillator frequency of the node S, the reference node R records a local time $T_{2,i}^{(R)}$ when receiving a data frame sent by the node S; as influenced by a fixed delay $d_1$ during data packet transmission and a random delay $X_1$ in an uplink, it can be obtained that $$T_{2,i}^{(R)}=\alpha\times T_{1,i}^{(S)}+\theta_{t0}+\alpha\times(d_1+x_i)$$

wherein $$\alpha=\frac{f_R}{f_S}$$

represents a clock frequency offset of the node S relative to the node R, $\theta_{t_0}$ represents an initial phase offset between the nodes, $X_i$ represents an independent and identically distributed Gaussian variable, and $d_1$ represents the fixed delay during data packet transmission;

the node R returning an ACK message to the node S to be synchronized after a timing response interval $w_i$, and records a local time $T_{3,i}^{(R)}$ when the ACK message is returned, wherein the interval $w_i$ is obtained according to the sequence number of the data packet received by the node R in each cycle and the corresponding rules for timing response;

S3: the node S to be synchronized records a local time $T_{4,i}^{(S)}$ when receiving a response message from the reference node R; assuming that a fixed delay $d_2$ during transmission of an ACK data packet is equal to the fixed time delay $d_1$ during data packet transmission minus a constant value m, wherein, $d_2=d_1-m$; similarly, with the influence of the fixed time delay $d_2$ during transmission and a random delay y in a downlink, the following timestamp relational expression is obtained:

$$T_{3,i}^{(R)}=\alpha\times T_{4,i}^{(S)}+\theta_{t0}-\alpha\times(d_2+Y_i)$$

wherein $Y_1$ is an independent and identically distributed Gaussian variable;

S4: repeating the above steps S1-S3; if $$\beta=\frac{1}{\alpha},$$

and a matrix is used to store the timestamps $T_{1,i}^{(S)}$, $T_{2,i}^{(R)}$, $T_{3,i}^{(R)}$, $T_{4,i}^{(S)}$ and different timing response intervals $w_i$ of the node R, then clock synchronization parameters, i.e., the clock frequency offset α and the fixed time delay $d_1$ during data packet transmission, can be estimated after N cycles, and the formulas are as follows:

$$\underbrace{\begin{bmatrix} T_{4,1}-T_{1,1}+m \\ T_{4,2}-T_{1,2}+m \\ \cdots \\ T_{4,N}-T_{1,N}+m \end{bmatrix}}_{\triangleq R} = \underbrace{\begin{bmatrix} T_{3,1}-T_{2,1} & 2 \\ T_{3,2}-T_{2,2} & 2 \\ \cdots & \cdots \\ T_{3,N}-T_{2,N} & 2 \end{bmatrix}}_{\triangleq M} \underbrace{\begin{bmatrix} \beta \\ d_1 \end{bmatrix}}_{\triangleq \Theta} + \underbrace{\begin{bmatrix} Z_1 \\ Z_2 \\ \cdots \\ Z_N \end{bmatrix}}_{\triangleq Z}$$

$$\hat{\Theta}=(M^H M)^{-1}M^H R$$

$$\hat{\alpha}=\frac{1}{\hat{\beta}}=\frac{1}{[\hat{\Theta}]_1}$$

$$\hat{d}_1=[\hat{\Theta}]_2$$

wherein $\hat{\alpha}$ is a clock frequency offset estimator, $\hat{d}_1$ is a fixed delay estimator during data packet transmission, and $Z_i=X_i+Y_i$ is the independent and identically distributed \ Gaussian variable, i.e., $Z_i$:N(0, $\sigma^2$).

2. The method for estimating clock frequency offsets of industrial wireless sensor networks based on timing response as claimed in claim 1, characterized in that: in step S2, two or more different values of the interval $w_i$ are obtained according to the corresponding rules; in the conditions of the sequence number Seq of the data packet received by the node R in each cycle modulo i with i≥2, the corresponding rules are as follows:

when the sequence number Seq % i=0, the timing response interval for returning ACK is $w_1$;

when the sequence number Seq % i=1, the timing response interval for returning ACK is $w_2$;

when the sequence number Seq % i=2, the timing response interval for returning ACK is $w_3$;

when the sequence number Seq % i=i−2, the timing response interval for returning ACK is $w_{i-1}$;

when the sequence number Seq % i=i−1, the timing response interval for returning ACK is $w_i$.

* * * * *